UNITED STATES PATENT OFFICE.

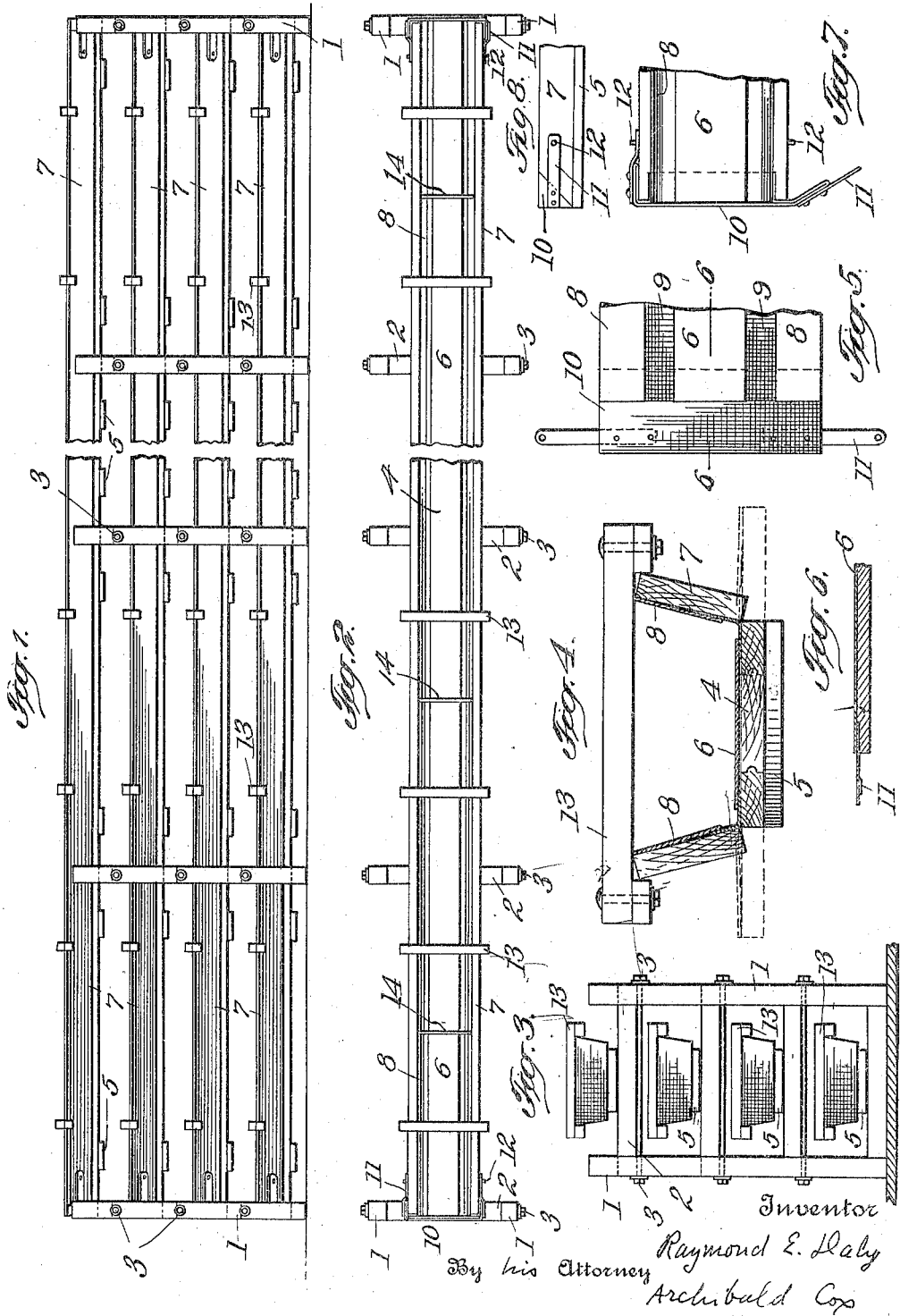
R. E. DALY.
APPARATUS FOR CRYSTALLIZING SUGAR.
APPLICATION FILED FEB. 27, 1917.
1,312,308. Patented Aug. 5, 1919.

RAYMOND E. DALY, OF CHICAGO, ILLINOIS, ASSIGNOR TO AMERICAN MAIZE PRODUCTS COMPANY, A CORPORATION OF MAINE.

APPARATUS FOR CRYSTALLIZING SUGAR.

1,312,308.  Specification of Letters Patent.  Patented Aug. 5, 1919.

Application filed February 27, 1917. Serial No. 151,200.

*To all whom it may concern:*

Be it known that I, RAYMOND E. DALY, a citizen of the United States, and a resident of Chicago, in the county of Cook and State of Illinois, have invented certain new and useful Improvements in Apparatus for Crystallizing Sugar, of which the following is a specification.

This invention relates to a new device which I have termed a sugar table. An object of the invention is to provide a water-tight mold with movable sides, in order that sugar or other substance crystallized or molded therein may easily be removed in the form of slabs. A further object of my invention is to arrange a series of sugar molds so as to provide a maximum molding capacity occupying the smallest possible amount of floor space, and at the same time having the molds conveniently accessible to the workmen.

In order that my invention may clearly be understood, I will describe the embodiment of it illustrated in the accompanying drawing, in which—

Figure 1 is a side elevation of my sugar table with the molds closed.

Fig. 2 is a plan of the sugar table with the molds closed.

Fig. 3 is an end elevation of the sugar table with the molds closed.

Fig. 4 is a transverse section of one of the molds in closed position.

Fig. 5 is a fragmentary plan of a mold in open position.

Fig. 6 is a section on the line 6—6 of Fig. 5.

Fig. 7 is a fragmentary plan view of a mold partially closed.

Fig. 8 is a fragmentary elevation of a mold in closed position.

The frame-work of my sugar table consists of uprights 1 and cross-beams 2 extending between the uprights. The uprights are also joined by the bolts 3 to give additional strength. Over the cross-beams 2 are laid the bottoms of the molds. These bottoms may consist of wooden planks 4, held together by cleats 5. The planks 4 are covered with sheets of galvanized iron 6. The sides of the tank consist of planks 7, lined with galvanized iron strips 8. The sides are hinged to the bottoms by means of canvas strips 9, which fasten under the edges of the galvanized iron lining plates 6 and 8. Each strip 9 preferably consists of several thicknesses of canvas. Each mold is provided with flexible ends 10, which consist of textile material, preferably several thicknesses of canvas sewed together. The flexible end is inserted under the ends of the galvanized iron strips 6 and 8 and extends as far as the dotted line shown in Figs. 5 and 7. To the under or outer side of the flexible ends are fastened straps 11 having holes which fit over the pins or hooks 12 on the side planks 7, when the molds are closed. The pins or hooks 12 are so placed that when the straps 11 are fitted over them, the flexible ends 10 are drawn taut and held in an upright position. (See Figs. 7 and 8.) The molds are provided with movable clamps or yokes 13 to hold the sides in closed position and with separating plates 14, which are the same shape and size as the internal cross-section of the molds when closed.

The operation of my sugar table is, as follows:—With the molds in closed position and the clamps or yokes 13 across them, as shown in Figs. 1, 2, 3 and 4, the sugar liquor is run into the molds by means of a hose or by some other convenient method. The sugar is then allowed to crystallize until the mass becomes granular. The galvanized iron separating plates 14 are then inserted in the molds at any desired intervals, thus separating the sugar in the molds into slabs of convenient length. When the sugar is completely crystallized, the straps 11 are unfastened from the hooks 12 and the yokes 13 are removed. The sides and flexible ends of the pan are then bent down flat to the position shown in Fig. 5 and by the dotted lines in Fig. 4. The side pieces are held in this position by resting upon the cross-beams 2. The slabs of sugar upon each mold may then easily be removed. After the removal of the slabs of sugar and the separating plates 14, the molds are closed and the yokes 13 replaced. The table is then ready for another charge of sugar liquor.

The open frame-work shown supports the molds and permits the free operation of their hinged sides, and renders access to the molds by workmen easy.

Many changes may be made in the apparatus described without departing from my invention. The end pieces, for example, need not be flexible throughout their entire length, but will operate satisfactorily if rigid during that portion of their length which is attached to the end of the bottom planks. I wish it clearly understood that my invention is by no means limited to the specific embodiment which I have described.

What I claim is:—

1. A mold for sugar liquor and the like having a bottom, sides hinged thereto, an end piece hinged to said bottom and having flexible portions attached to the ends of said sides, straps attached to said end piece, and means for fastening said straps to said sides when the mold is closed.

2. A mold for sugar liquor or the like having a bottom and sides hinged thereto and an end piece hinged to said bottom having flexible portions attached to said sides, means for holding the central portion of said end piece upright when said mold is closed, and a clamp fitting over the top of said mold to retain the sides in upright position when the mold is closed.

3. A mold for sugar liquor and the like having a bottom and sides hinged thereto, end pieces hinged to the ends of said bottom and having flexible portions attached to the ends of said sides, means for holding said sides and said end pieces upright when the mold is closed, and a plurality of separating plates whose shape corresponds to the internal cross-section of the mold when closed.

4. A mold for sugar liquor and the like having a bottom, sides hinged to said bottom, and a flexible end piece attached to the ends of said sides and said bottom.

5. A mold for sugar liquor and the like having a bottom, sides hinged thereto, a flexible end piece attached to the ends of said sides and said bottom, straps attached to said end piece, and means for fastening said straps to said sides when the mold is closed whereby said flexible end piece is held taut.

6. A mold for sugar liquor and the like having a bottom, two sides hinged thereto, a flexible end piece attached to the ends of said sides and said bottom, straps attached to said end piece and means for fastening said straps to said sides when the mold is closed, and a clamp extending across the top of said mold and embracing said sides to secure them so that each side forms an obtuse angle with the bottom and holds taut said flexible end piece.

7. A sugar table, comprising a framework consisting of uprights joined by a plurality of cross-beams, a plurality of molds with hinged sides resting upon said cross-beams, the distance between said uprights being as great as the width of said molds when the sides are extended parallel to their bottoms.

RAYMOND E. DALY.

Copies of this patent may be obtained for five cents each, by addressing the "Commissioner of Patents, Washington, D. C."